(12) United States Patent
Hand

(10) Patent No.: US 9,341,321 B2
(45) Date of Patent: May 17, 2016

(54) LENS HAVING LIGHT TRANSMISSIVE PORTION AND OPTIC SHIELD PORTION

(71) Applicant: ABL IP Holding LLC, Conyers, GA (US)

(72) Inventor: Mark Anthony Hand, Covington, GA (US)

(73) Assignee: ABL IP Holding LLC, Decatur, GA (US)

( * ) Notice: Subject to any disclaimer, the term of this patent is extended or adjusted under 35 U.S.C. 154(b) by 0 days.

(21) Appl. No.: 14/153,301

(22) Filed: Jan. 13, 2014

(65) Prior Publication Data

US 2014/0126217 A1    May 8, 2014

Related U.S. Application Data

(63) Continuation of application No. 12/868,195, filed on Aug. 25, 2010, now abandoned.

(60) Provisional application No. 61/236,693, filed on Aug. 25, 2009.

(51) Int. Cl.

| F21V 5/04 | (2006.01) |
|---|---|
| B29D 11/00 | (2006.01) |
| B29C 45/16 | (2006.01) |
| F21K 99/00 | (2016.01) |
| F21V 5/08 | (2006.01) |
| F21V 13/02 | (2006.01) |
| F21V 13/04 | (2006.01) |

(Continued)

(52) U.S. Cl.
CPC . *F21K 9/50* (2013.01); *B29C 45/16* (2013.01); *B29D 11/0074* (2013.01); *F21V 5/08* (2013.01); *F21V 11/00* (2013.01); *F21V 13/02* (2013.01); *F21V 13/04* (2013.01); *B29K 2995/0025* (2013.01); *B29K 2995/0026* (2013.01); *B29L 2011/0016* (2013.01); *F21Y 2101/02* (2013.01)

(58) Field of Classification Search
CPC .............. B29D 11/0074; B29D 11/00355; F21K 9/50; F21V 13/02; F21V 7/00; F21V 7/10; F21V 7/22; F21V 5/04–5/08; B29C 45/16; H01L 33/52–33/60
See application file for complete search history.

(56) References Cited

U.S. PATENT DOCUMENTS

| 2,072,286 A | 3/1937 | Wellington |
|---|---|---|
| 6,042,251 A | 3/2000 | McCarthy et al. |

(Continued)

OTHER PUBLICATIONS

Non-Final Office Action for U.S. Appl. No. 12/868,195, mailed Oct. 12, 2012 (5 pages).

(Continued)

*Primary Examiner* — Mariceli Santiago
(74) *Attorney, Agent, or Firm* — Kilpatrick Townsend & Stockton, LLP

(57) ABSTRACT

A lighting assembly includes a light source and a lens. The lens includes a light transmissive portion and an optic shield portion for blocking or redirecting at least a portion of light generated by the light source. The light source can include one or more light emitting diodes (LEDs). The optic shield can be painted on or otherwise applied to a portion of the lens. Alternatively, it can be integrally formed with the lens. The optic shield can be an opaque material for blocking light generated by the light source or can be a reflective material for reflecting light generated by the light source through the light transmissive portion of the lens. Methods for making an optic shield are also described.

22 Claims, 2 Drawing Sheets

(51) Int. Cl.
  *F21V 11/00* (2015.01)
  *B29L 11/00* (2006.01)
  *F21Y 101/02* (2006.01)

(56) References Cited

U.S. PATENT DOCUMENTS

| | | |
|---|---|---|
| 6,447,155 B2 | 9/2002 | Kondo et al. |
| 6,607,286 B2 | 8/2003 | West et al. |
| 6,674,096 B2 | 1/2004 | Sommers et al. |
| 6,679,621 B2 | 1/2004 | West et al. |
| 6,886,962 B2 | 5/2005 | Suehiro |
| 7,246,930 B2 | 7/2007 | Yatsuda et al. |
| 7,312,477 B2 | 12/2007 | Yatsuda et al. |
| 7,344,902 B2 | 3/2008 | Basin et al. |
| 7,434,970 B2 | 10/2008 | Machi et al. |
| 7,438,445 B2 | 10/2008 | Shiau et al. |
| 2004/0057123 A1 | 3/2004 | Magocs et al. |
| 2005/0036214 A1 | 2/2005 | Jewers et al. |
| 2006/0098308 A1* | 5/2006 | Angelini et al. ............. 359/820 |
| 2006/0138440 A1 | 6/2006 | Jyo |
| 2007/0217215 A1 | 9/2007 | Lee |
| 2008/0117646 A1 | 5/2008 | Yatsuda et al. |
| 2008/0123337 A1 | 5/2008 | Higashi et al. |
| 2008/0237618 A1 | 10/2008 | Ko et al. |
| 2008/0239741 A1 | 10/2008 | Nakada et al. |
| 2008/0272380 A1 | 11/2008 | Wilcox |
| 2008/0298072 A1 | 12/2008 | Chang |
| 2009/0308926 A1* | 12/2009 | Canini et al. ............. 235/454 |
| 2010/0091484 A1* | 4/2010 | Mayfield et al. ............. 362/223 |
| 2010/0321949 A1 | 12/2010 | Ohno et al. |
| 2012/0229025 A1 | 9/2012 | Edwards, Jr. et al. |

OTHER PUBLICATIONS

Response to Restriction Requirement for U.S. Appl. No. 12/868,195, filed Nov. 9, 2012 (6 pages).

Non-Final Office Action for U.S. Appl. No. 12/868,195, mailed Dec. 14, 2012 (9 pages).

Amendment and Response to Office Action for U.S. Appl. No. 12/868,195, filed May 14, 2013 (13 pages).

Final Office Action for U.S. Appl. No. 12/868,195, mailed Jul. 12, 2013, (13 pages).

* cited by examiner

LENS HAVING LIGHT TRANSMISSIVE PORTION AND OPTIC SHIELD PORTION

CROSS-REFERENCE TO RELATED APPLICATION

This application is a continuation of U.S. application Ser. No. 12/868,195, filed Aug. 25, 2010, which claims the benefit of U.S. Provisional patent application Ser. No. 61/236,693, filed Aug. 25, 2009, both of which are incorporated herein by this reference in their entirety.

FIELD

Embodiments of the present invention relate to optical light shielding.

BACKGROUND

In the lighting industry, it is desirable that light fixtures emit and direct light in only desired areas. Preventing unwanted light glare or light trespass into unwanted areas is desirable. One method for preventing light from entering certain areas is referred to as light shielding. Light shielding is found in many traditional lighting applications, such as High Intensity Discharge (HID) lamps, in which a barrier or shield is positioned between the light source and the area in which light is not desired. This same conventional method may be used with light emitting diodes (LEDs). For example, LEDs 10 may have barriers 20 placed adjacent lenses 30, as shown in FIG. 1. The barriers 20 prevent light from reaching areas not desired to be illuminated. However, as shown in FIG. 1, the barrier is a separate component from the lens and LED which can lead to increased construction costs and installation time. Therefore, there is a need for alternative configurations to achieve this same result.

SUMMARY

Certain embodiments of the present invention provide light shields integral with the optics.

DETAILED DESCRIPTION

Certain embodiments of the present invention provide a combination of shielding within the optics of a light source. The shielding may be integrated and formed within the optics used to direct the light source. The shielding may block the light, or redirect the light into an area in which light is desired.

Figure 1:
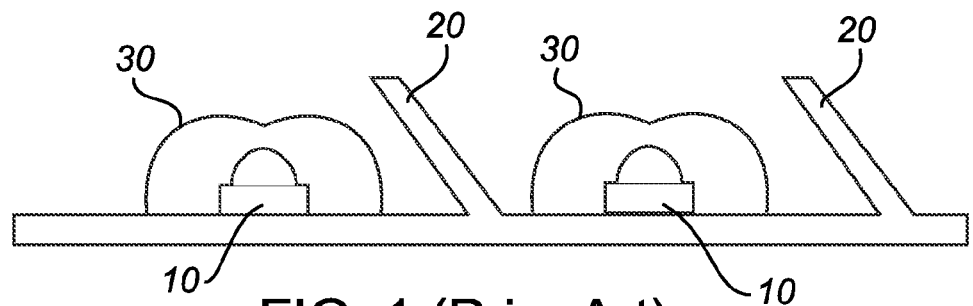
FIG. 1 is a cross-sectional view of a prior art LED and shield configuration.
Figure 2:
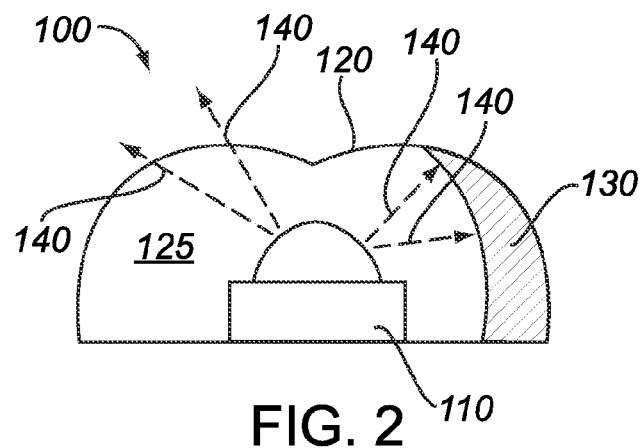
FIG. 2 is a cross-sectional view of a lighting assembly using optic shielding according to one embodiment of this invention.
Figure 2A:
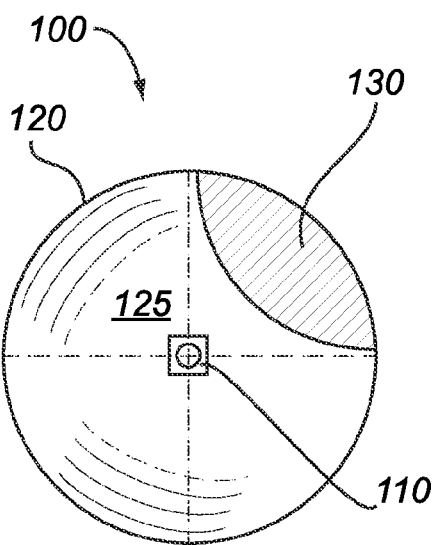
FIG. 2A is a top view of a lighting assembly using optic shielding according to the embodiment of FIG. 2.

As shown in FIGS. 2 and 2A, the lighting assembly 100 includes a light source such as an LED 110 positioned within a lens 120. While LEDs are used in the illustrated embodiments described herein, other sources of light are contemplated. In yet other embodiments, the lighting assembly 100 can include a plurality of LEDs 110.

The configuration of the lens 120 may vary depending on the desired optical properties. In the embodiment of FIG. 2, the lens 120 includes a light transmissive portion 125 and a shield 130 formed of an opaque paint or other material that is positioned along a portion of the surface area of the lens 120. The lens 120 could be made out of glass, a thermoplastic material such as acrylic, polycarbonate or combinations thereof, or any other optically clear material.

The shield 130 blocks transmission of the light produced by the LED 110, preventing the light 140 from exiting the lens 120 in the area provided with shield 130. The shield 130 may be made of any opaque material that does not allow light 140 to transmit through it. Suitable opaque materials include, but are not limited to, dark paint, silicone, and epoxy. The opaque material forming the shield 130 may be painted or applied to the outer or inner surface of the lens 120. In one application method, the light transmissive portion 125 of the lens 120 is masked so that only the desired shape and size of the shield 130 is exposed. The opaque material is then applied to the lens 120 so that the material adheres only to the exposed portion of the lens 120 intended to form the shield 130. With respect to all of the embodiments disclosed herein, one of skill in the art will understand that the shape, size, and positioning of the shield 130, 230, 330 on the lens 120, 220, 320 may be tailored to suit particular applications and by no means is limited to the embodiments disclosed herein.

Figure 3:
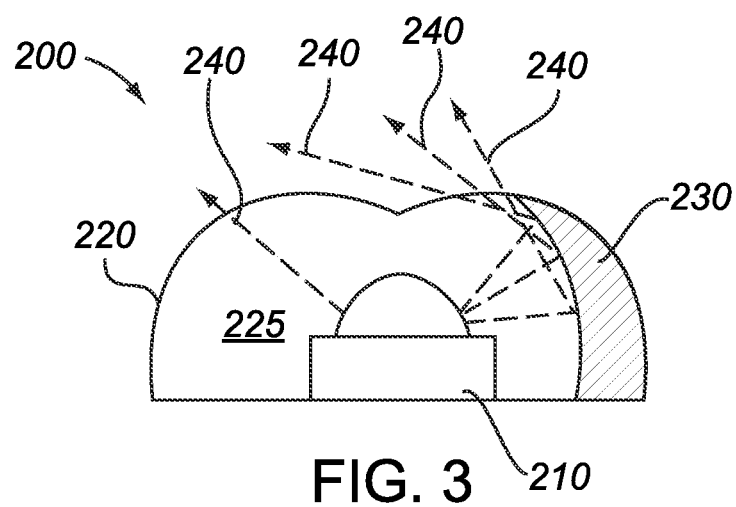
FIG. 3 is a cross-sectional view of a lighting assembly using optic shielding according to another embodiment of this invention.

Similar to the embodiment of FIGS. 2 and 2A, the lighting assembly 200 illustrated in FIG. 3 allows transmission of light generated by at least one light source such as an LED 210 through a light transmissive portion 225 of a lens 220, and further includes a shield 230 that prevents transmission of light 240 emitted from the at least one LED 210 through the lens 220 in the shielded areas. However, the shield 230 is formed of a reflective material that reflects that same light 240 in a desired direction. The shield 230 may be formed on the outer or inner surface of the lens 220. In one embodiment, a polymeric material is applied to the outer surface of the lens 220 and a metallic finish applied (such as via a vacuum metalizing process) to impart reflectivity. In other embodiments, a reflective paint is used to form the reflective shield 230. Exemplary paints include those sold under the tradenames GL-22, GL-80 and GL-30, all available from DuPont. In yet other embodiments, a reflective liner (not illustrated), such as Optilon™ available from DuPont, may be applied to the lens 220 to form the shield 230.

Figure 4:
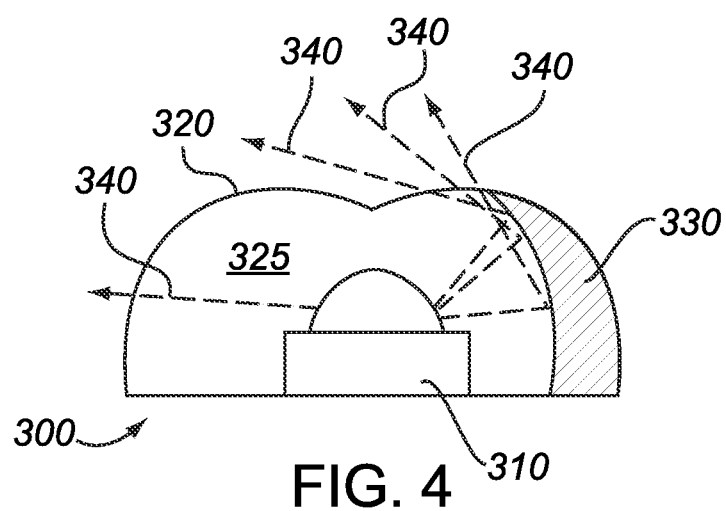
FIG. 4 is a cross-sectional view of a lighting assembly using optic shielding according to another embodiment of this invention.

The lighting assembly 300 of FIG. 4 operates in much the same fashion as that in FIG. 3, with a lens 320 having a light transmissive portion 325 and a shield 330, but is formed of a co-molding process to form the shield 330 integral with the lens 320. A first thermoplastic material such as polycarbonate is introduced into a mold to form the light transmissive portion 325 of the lens 320, and a second material, preferably a highly reflective plastic or other material such as opaque polycarbonate, acrylonitrile-butadiene-styrene (abs), nylon other polymeric material, is introduced into the mold to form the non-light transmissive portion or reflective shield 330. The shield 330 blocks light 340 emitted by the at least one LED 310 in the one direction and, if reflective, redirects the light 340 in another direction.

The foregoing is provided for purposes of illustrating, explaining, and describing embodiments of the present invention. Further modifications and adaptations to these embodi-

I claim:

1. A method for forming a lens for a lighting assembly, wherein the lens comprises an outer surface, an inner surface defining a cavity, a light transmissive portion, and an optic shield portion, the method comprising:
co-molding a first thermoplastic material and a second thermoplastic material different from the first thermoplastic material to form the lens,
wherein: (i) the first thermoplastic material forms the light transmissive portion and the second thermoplastic material forms the optic shield portion; (ii) the cavity comprises a central axis that lies within an imaginary plane; (iii) the imaginary plane divides the lens into a first portion and a second portion; (iv) the optic shield portion is located in only one of the first portion and the second portion of the lens; and (iv) the optic shield portion blocks light that impinges on the optic shield portion from passing through the optic shield portion of the lens.

2. The method of claim 1, wherein the first thermoplastic material comprises acrylic, polycarbonate or combinations thereof and the second thermoplastic material comprises silicone, reflective plastic, opaque polycarbonate, acrylonitrile-butadiene-styrene, nylon or combinations thereof.

3. The method of claim 1, wherein the optic shield portion reflects at least some of the light that impinges on the optic shield portion of the lens towards the light transmissive portion of the lens.

4. The method of claim 1, wherein the lens is symmetrical about the imaginary plane.

5. The method of claim 1, wherein the central axis further lies within an intersecting plane that intersects the imaginary plane to divide the lens into a first section, a second section, a third section and a fourth section of the lens, wherein the optic shield portion is located in only one of the first, second, third, and fourth sections of the lens.

6. The method of claim 5, wherein the lens is symmetrical about the imaginary plane and about the intersecting plane.

7. The method of claim 1, wherein the optic shield portion is exposed on the outer surface of the lens.

8. The method of claim 1, wherein the optic shield portion reflects at least some of the light that impinges on the optic shield portion towards and across the imaginary plane.

9. The method of claim 1, wherein the second thermoplastic material comprises silicone, reflective plastic, opaque polycarbonate, acrylonitrile-butadiene-styrene, nylon or combinations thereof.

10. A method for forming a lighting assembly comprising a lens and at least one light source that emits light, the method comprising:
(a) forming a lens having an outer surface, an inner surface defining a cavity, a light transmissive portion, and an optic shield portion by
co-molding a first thermoplastic material and a second thermoplastic material different from the first thermoplastic material to form the lens, wherein: (i) the first thermoplastic material forms the light transmissive portion and the second thermoplastic material forms the optic shield portion; (ii) the cavity comprises a central axis that lies within an imaginary plane; (iii) the imaginary plane divides the lens into a first portion and a second portion; and (iv) the optic shield portion is located in only one of the first portion and the second portion of the lens; and
(b) positioning the lens at least partially over the at least one light source so that the at least one light source resides in the cavity and so that a first portion of the emitted light impinges on the light transmissive portion of the lens and a second portion of the emitted light impinges on the optic shield portion of the lens, wherein the optic shield portion blocks the second portion of the emitted light from passing through the optic shield portion of the lens.

11. The method of claim 10, wherein the first thermoplastic material comprises acrylic, polycarbonate or combinations thereof and the second thermoplastic material comprises silicone, reflective plastic, opaque polycarbonate, acrylonitrile-butadiene-styrene, nylon or combinations thereof.

12. The method of claim 10, wherein the optic shield portion reflects at least some of the second portion of the emitted light towards the light transmissive portion of the lens.

13. The method of claim 10, wherein the lens is symmetrical about the imaginary plane.

14. The method of claim 10, wherein the central axis further lies within an intersecting plane that intersects the imaginary plane to divide the lens into a first section, a second section, a third section and a fourth section of the lens, wherein the optic shield portion is located in only one of the first, second, third, and fourth sections of the lens.

15. The method of claim 14, wherein the lens is symmetrical about the imaginary plane and about the intersecting plane.

16. The method of claim 10, wherein the optic shield portion is exposed on the outer surface of the lens.

17. The method of claim 10, wherein the optic shield portion reflects at least some of the second portion of the emitted light towards and across the imaginary plane.

18. The method of claim 10, wherein the second thermoplastic material comprises silicone, reflective plastic, opaque polycarbonate, acrylonitrile-butadiene-styrene, nylon or combinations thereof.

19. A method for forming a lens for a lighting assembly, wherein the lens comprises an outer surface, an inner surface defining a cavity, a light transmissive portion, and an optic shield portion, the method comprising co-molding a first thermoplastic material and a second thermoplastic material different from the first thermoplastic material to form the lens, wherein:
(i) the first thermoplastic material forms the light transmissive portion and the second thermoplastic material forms the optic shield portion;
(ii) the cavity comprises a central axis that lies within an imaginary plane;
(iii) the imaginary plane divides the lens into a first portion and a second portion;
(iv) the optic shield portion is located in only one of the first portion and the second portion of the lens;
(v) the optic shield portion is exposed on the outer surface of the lens; and
(vi) the optic shield portion blocks light that impinges on the optic shield portion from passing through the optic shield portion and reflects at least some of the light that impinges on the optic shield portion towards the light transmissive portion of the lens.

20. The method of claim 19, wherein the lens is symmetrical about the imaginary plane.

21. The method of claim 19, wherein the central axis further lies within an intersecting plane that intersects the imaginary plane to divide the lens into a first section, a second section, a third section and a fourth section of the lens, wherein the optic shield portion is located in only one of the first, second, third, and fourth sections of the lens.

22. The method of claim 21, further comprising positioning the lens at least partially over at least one light source so that the at least one light source resides in the cavity.

\* \* \* \* \*